April 8, 1924.

C. L. BRACKETT 1,489,479

PROCESS OF MANUFACTURING HEADED TAPPETS

Filed Nov. 2, 1922

Inventor
Clare L. Brackett
By William M. Swan
Attorney

Patented Apr. 8, 1924.

1,489,479

UNITED STATES PATENT OFFICE.

CLARE L. BRACKETT, OF DETROIT, MICHIGAN.

PROCESS OF MANUFACTURING HEADED TAPPETS.

Application filed November 2, 1922. Serial No. 598,662.

*To all whom it may concern:*

Be it known that I, CLARE L. BRACKETT, a citizen of the United States, residing at Detroit, county of Wayne, State of Michigan, have invented a certain new and useful Improvement in Processes of Manufacturing Headed Tappets, and declare the following to be a full, clear, and exact description of the same, such as will enable others skilled in the art to which it pertains to make and use the same, reference being had to the accompanying drawings, which form a part of this specification.

This invention relates to an improved process of manufacturing hard headed or tappet bolts and the product resulting therefrom. It has for its object the avoidance of the now expensive machining and use of an article of this character composed entirely of hard steel, which is not really needed as to the threaded stem portion, only the head being required to be hard, and which requires special and expensive handling and protection if an attempt is made to harden the head after the threading and other machining steps have been completed.

Figure 1:
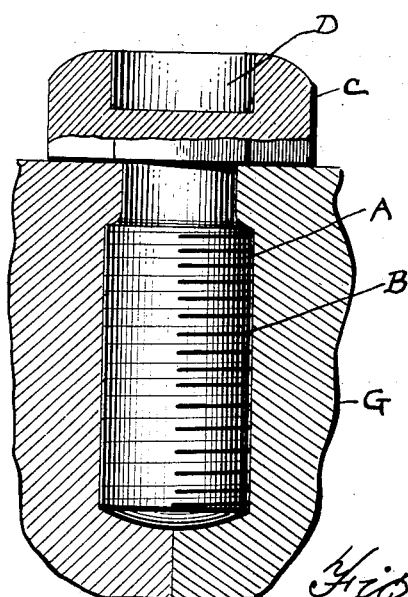
Figure 1 is a elevational view, partly in section, of a headed bolt, with a recess bored in its upper end for receiving the hardened slug or insert.
Figure 2:
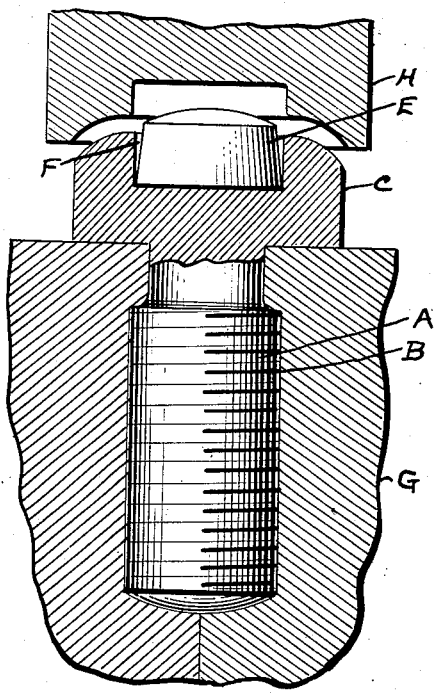
Figure 2 is a similar view, with the tapered slug in position in the bore and with the deforming die about to engage the soft metal bolt head.
Figure 3:
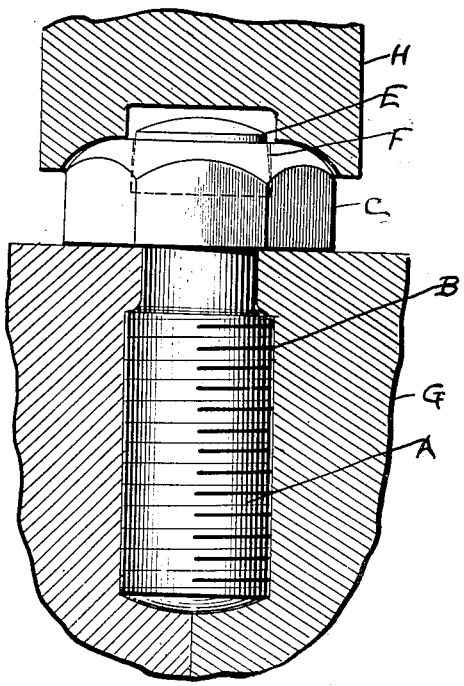
Figure 3 is a similar view of the bolt at the end of the die action, showing in spaced exaggeration the engagment of the metal surfaces.
Figure 4:
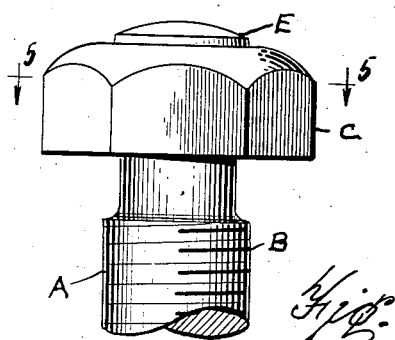
Figure 4 is a side elevational view of a finished bolt.
Figure 5:
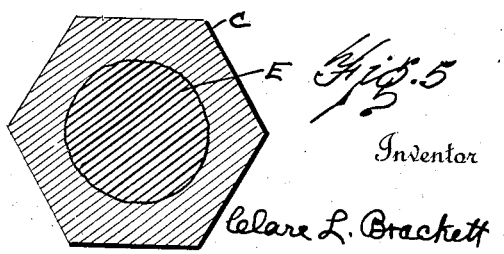
Figure 5 is a cross-sectional view taken along the line 5—5 of Figure 4 and looking in the direction of the arrows there shown.

A represents a stem or bolt of relatively soft metal provided, if desired with threadings B and a head of whatever shape may be desired, that herein illustrated being hexagonal. When such an article as this is desired for use as a gas engine tappet element, or for a similar service in which a selected point on its surface, as at one end, is designed to receive frequent repeated impact from another operative element, it has been heretofore thought necessary, or at least advisable, to either have the entire article made of hard steel, which involves quite an expense especially as to machining, or else to harden the end portion by some one of the various surface-hardening processes, each of which, however, has been found to be either injurious to the already threaded or other machined parts, or to involve expensive preliminary protection thereof before the hardening process is begun.

In place of this, I provide a comparatively inexpensive bolt or stem of relatively soft steel, and in its head I bore a co-axial recess D, having generally straight sides and having its bottom preferably though not necessarily squared, instead of being left in the inwardly tapering form which a boring element would leave. In this bored space I insert a hard metal slug or contact piece E, preferably of truncated conical cross-section, so that there remains about the upper portion of the inwardly sloping sides of the piece E a space F. The bolt A being suitably supported within the recess of a holding-block G, I now subject the top of the soft metal stem to the deforming action of a descending die member H, whose active face is of sufficiently variant curvature from that of the top of the stem so that upon striking the soft metal thereof immediately surrounding the bore D, it causes a centrifugal flow of the metal into the space F about and against the side surfaces of the hard metal piece E, thus locking the same in desired relative position with regards to the bolt as a whole, and in fact causing such a structural uniting of the soft and hard metal parts that even when an article thus completed is cross-sectionally ground it is hard to distinguish the line separating the two qualities of metal.

There is thus provided a bolt whose main body portion of relatively soft metal is of ample strength to withstand the impacts which it is designed to receive, and the actual surface portion of which receives the wearing thrust of an external member is of the desired additional degree of hardness which resists wear.

What I claim is:

The process of correlating a relatively soft stem and a relatively hard head consisting in boring a co-axially disposed and relatively small recess in the top of said stem, inserting therein a hard metal piece and forcing the metal around the edges of the bore to flow inwardly into engagement with the sides of said hard metal piece and render the same operatively integral with the body of the relatively soft stem without disturbing the periphery of the top of the stem.

In testimony whereof, I sign this specification in the presence of two witnesses.

CLARE L. BRACKETT.

Witnesses:
WILLIAM M. SWAN,
EDWARD P. ECHLIN.